United States Patent
Ghajar et al.

(10) Patent No.: US 10,135,476 B2
(45) Date of Patent: Nov. 20, 2018

(54) NOISE CANCELLATION

(71) Applicant: Apple Inc., Cupertino, CA (US)

(72) Inventors: Mohammad Reza Ghajar, San Jose, CA (US); Huanyu Chen, Fremont, CA (US); Robert S. Sorensen, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/012,347

(22) Filed: Feb. 1, 2016

(65) Prior Publication Data

US 2017/0222673 A1    Aug. 3, 2017

(51) Int. Cl.
*H04B 1/10*    (2006.01)
*H04B 1/18*    (2006.01)

(52) U.S. Cl.
CPC ............. *H04B 1/1036* (2013.01); *H04B 1/18* (2013.01); *H04B 2001/1063* (2013.01)

(58) Field of Classification Search
CPC ...... H04B 1/1036; H04B 1/18; H04B 1/1027; H04B 1/10; H04B 1/525; H04B 1/15; H04B 1/0475
See application file for complete search history.

(56) References Cited

U.S. PATENT DOCUMENTS

| | | | | |
|---|---|---|---|---|
| 6,313,713 | B1* | 11/2001 | Ho | H04B 1/52 333/1.1 |
| 6,473,596 | B1* | 10/2002 | Stamper | H04B 1/123 333/12 |
| 6,675,004 | B1 | 1/2004 | Waylett | |
| 6,690,743 | B1* | 2/2004 | Pellonpera | H03C 3/08 375/219 |
| 6,792,250 | B1 | 9/2004 | Zarubin | |
| 8,594,603 | B2 | 11/2013 | Balankutty et al. | |
| 2002/0072344 | A1 | 6/2002 | Souissi | |
| 2008/0041953 | A1 | 2/2008 | Frederick et al. | |
| 2008/0057885 | A1* | 3/2008 | Rofougaran | H04B 1/1036 455/137 |
| 2008/0279122 | A1* | 11/2008 | Fukuda | H04B 1/525 370/278 |
| 2011/0256857 | A1* | 10/2011 | Chen | H04B 1/525 455/422.1 |
| 2015/0036762 | A1 | 2/2015 | Vann | |

OTHER PUBLICATIONS

Zhou et al., Low-Noise Active Cancellation of Transmitter Leakage and Transmitter Noise in Broadband Wireless Receivers for FDD/Co-Existence, IEEE Journal of Solid-State Circuits, vol. 49, No. 12, Dec. 2014.

* cited by examiner

*Primary Examiner* — Lewis West
*Assistant Examiner* — Dong-Chang Shiue
(74) *Attorney, Agent, or Firm* — Fletcher Yoder PC

(57) ABSTRACT

An electronic device includes an antenna configured to receive a wireless transmission. The wireless transmission includes noise and data to be received. The electronic device includes a signal splitter that splits the wireless transmission into a first signal and a second signal. The electronic device includes a filter configured to filter the data to be received in the first signal. Furthermore, the electronic device includes merging circuitry configured to subtract the first signal from the second signal to reduce the noise in the second signal.

23 Claims, 15 Drawing Sheets

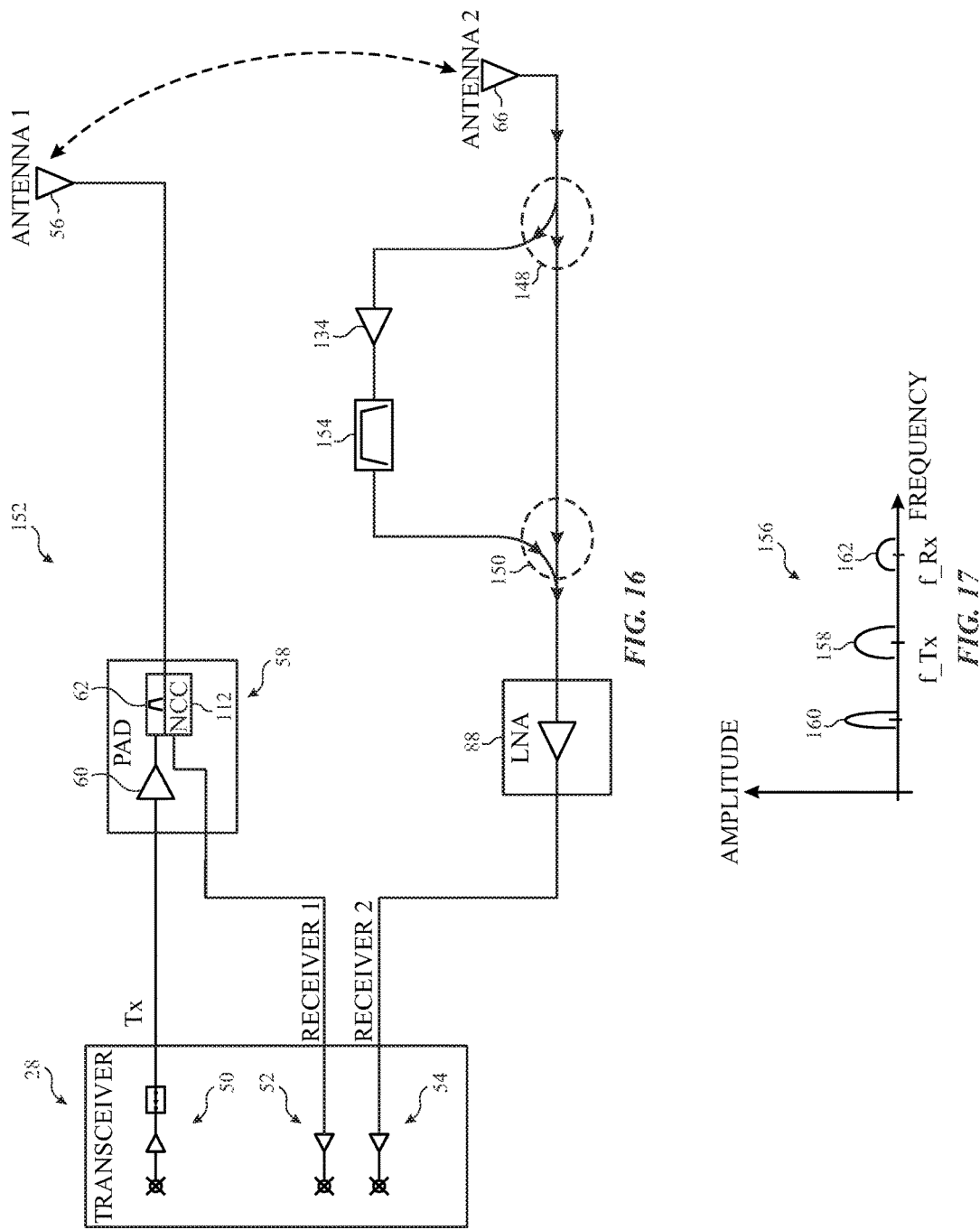

NOISE CANCELLATION

BACKGROUND

The present disclosure relates generally to techniques for cancelling noise received by a wireless receiver.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

When wireless transmissions are received, the wireless transmissions are often accompanied by noise that can interfere with proper interpretation of the wireless transmission. In some cases, the noise has a much higher amplitude than the received wireless transmission. Indeed, the amplitude of the received wireless transmission may be very small. Thus, if amplitude of the received wireless transmission is lost when filtering out the noise, the fidelity of the wireless transmission may be diminished.

Some of the noise in these received signals included leakage is mainly due to finite isolation between transmitter and receiver chains of wireless devices. In other words, the receiver of an electronic device may also capture part of the transmission from a transmitter of the electronic device as cross-interference. Because of this cross-interference, an amplifier used to prepare the received signal for processor may be overloaded to the relatively high amplitude of the cross-interference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosure teaches a receiver system that includes receiving a wireless signal with noise and using the received signal to generate a noise signal. The noise signal is then combined with/subtracted from the received signal to reduce an amount of noise in the received signal that is passed to a respective receiver.

BRIEF DESCRIPTION OF THE DRAWINGS

Various aspects of this disclosure may be better understood upon reading the following detailed description and upon reference to the drawings in which:

FIG. 16 illustrates a schematic diagram of a receiver system with noise cancellation circuitry with a band pass filter, according to an embodiment;

FIG. 17 illustrates a frequency spectrum graph of the noise cancelled wireless transmission of FIG. 16, according to an embodiment;

FIG. 19 illustrates a schematic diagram of a receiver system with noise cancellation circuitry with an isolator in feed forward circuitry, according to an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with the present techniques, the disclosure introduces an approach to reduce over the air and conducted transmitter leakage and/or other noise in receiver chains without submitting the received data signal to a lossy filter. Thus, receiver front-end losses may be reduced/eliminated, which results in better overall sensitivity and potentially reduced radio's front end size. Furthermore, since the disclosed approach includes deriving a noise signal from actual received signals, the approach is less vulnerable to antenna miss match and environmental changes than if noise cancellation is performed using samplings from the transmission antenna signal. In other words, by deriving a noise signal from data received at an antenna, the noise signal corresponds to actual received noise instead of a theoretical noise (e.g., cross-interference) that may result from transmission leakage. This is especially noteworthy because the actual noise can fluctuate from the theoretical noise when atmospheric conditions or other antenna matching issues cause a different amplitude of transmission leakage.

Specifically, an antenna receives a signal and routes the signal down two channels. In the first channel, the desired data (e.g., signal data) is filtered from the received signal leaving a noise signal. For instance, the noise signal in the first channel may include cross-interference (e.g., transmission leakage) and/or other noise. The noise signal in the first channel is then used to cancel noise in the second channel. For example, the noise signal may be subtracted from the signal in the second channel to reduce/cancel noise in the second channel.

Figure 1:
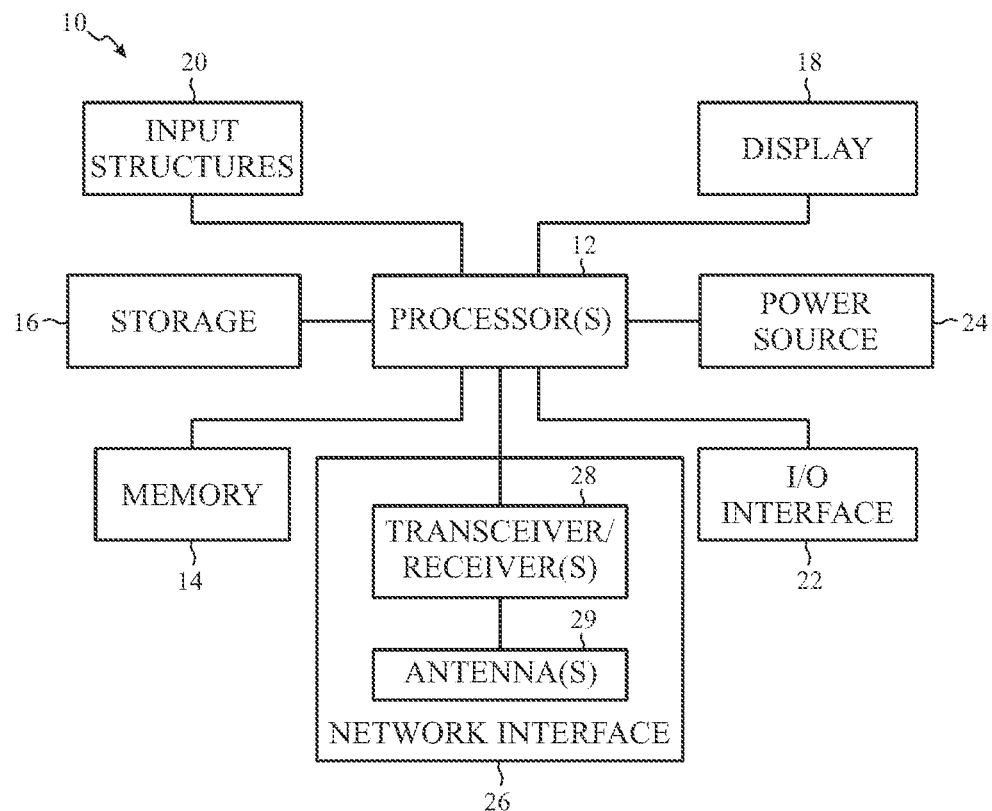
FIG. 1 is a schematic block diagram of an electronic device including wireless transceiver(s)/receiver(s), in accordance with an embodiment.

With these features in mind, a general description of suitable electronic devices that may noise cancellation circuitry. Turning first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and network interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

The network interface(s) 26 enable the electronic device 10 to connect to one or more network types. For example, the network interface(s) 26 may be configured to connect to 802.11 networks, 802.15.4 networks, cellular (e.g., long-term evolution LTE) networks, and/or other wireless network types that may be suitable for use by the electronic device 10. The network interface(s) 26 include transceiver/receiver(s) 28 and antenna(s) 29. The transceiver/receiver(s) 28 may include one or more receivers and//or transmitters that are configured to send and/or receive information via one or more respective antennas of the antenna(s) 29. Each transceiver/receiver 28 may be connected to its own antenna 29. Alternatively, at least some of the transceiver/receiver(s) 28 may share an antenna 29.

Figure 2:
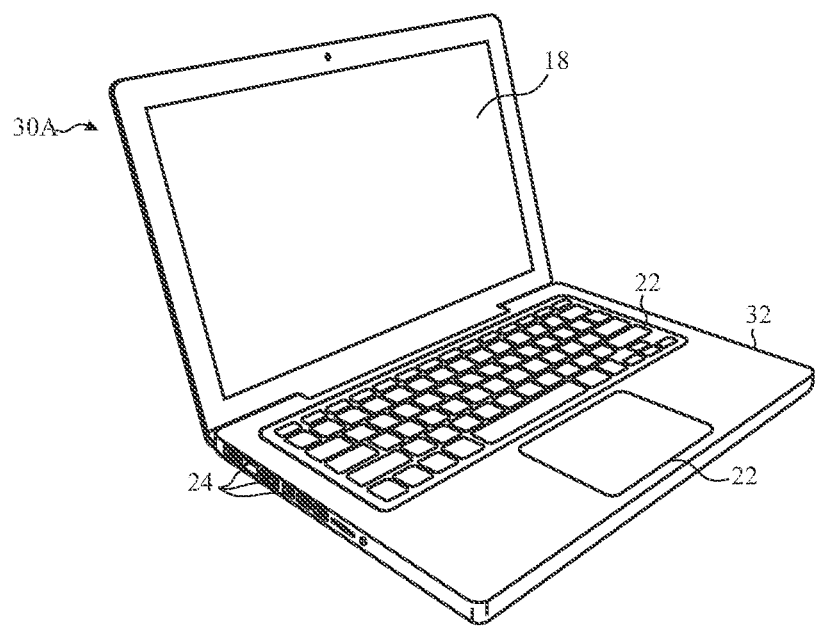
FIG. 2 is a perspective view of a notebook computer representing an embodiment of the electronic device of FIG. 1, in accordance with an embodiment.
Figure 3:
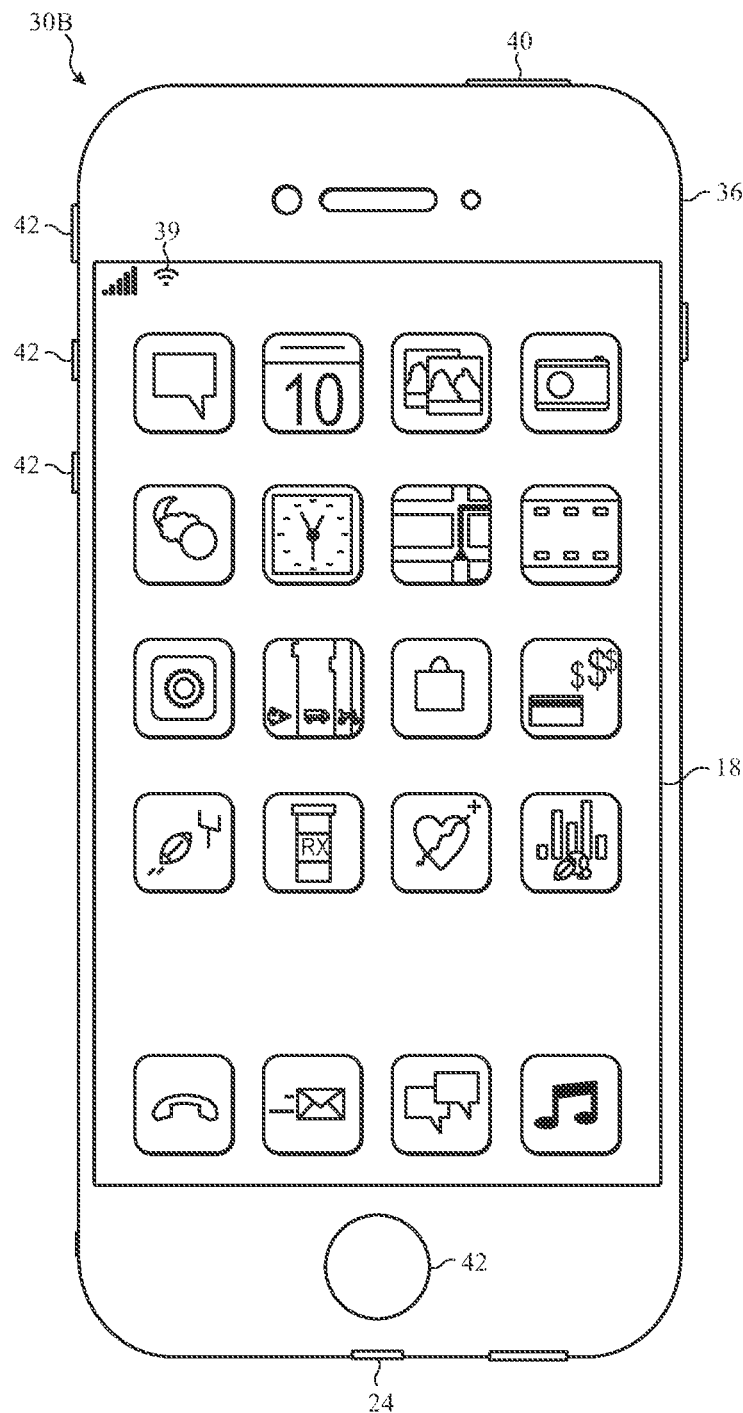
FIG. 3 is a front view of a hand-held device representing another embodiment of the electronic device of FIG. 1, in accordance with an embodiment.
Figure 4:
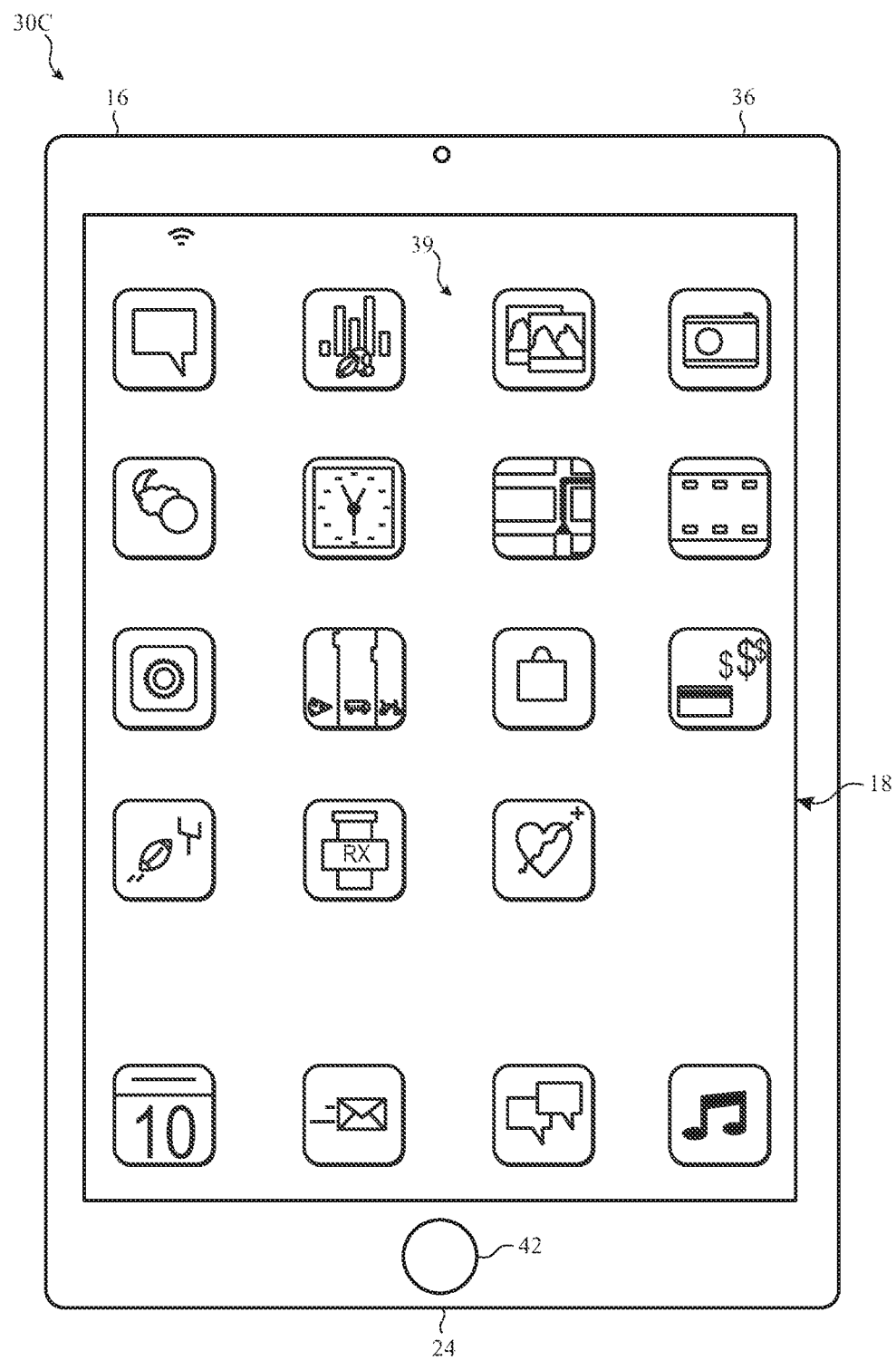
FIG. 4 is a front view of another hand-held device representing another embodiment of the electronic device of FIG. 1, in accordance with an embodiment.
Figure 5:
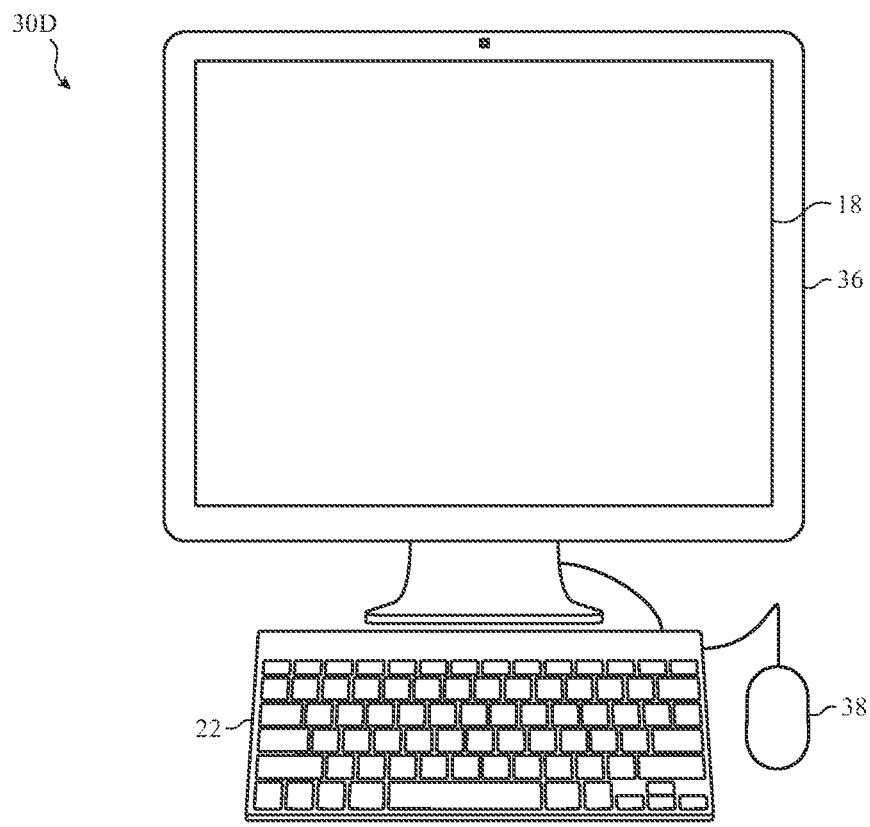
FIG. 5 is a front view of a desktop computer representing another embodiment of the electronic device of FIG. 1, in accordance with an embodiment.
Figure 6:
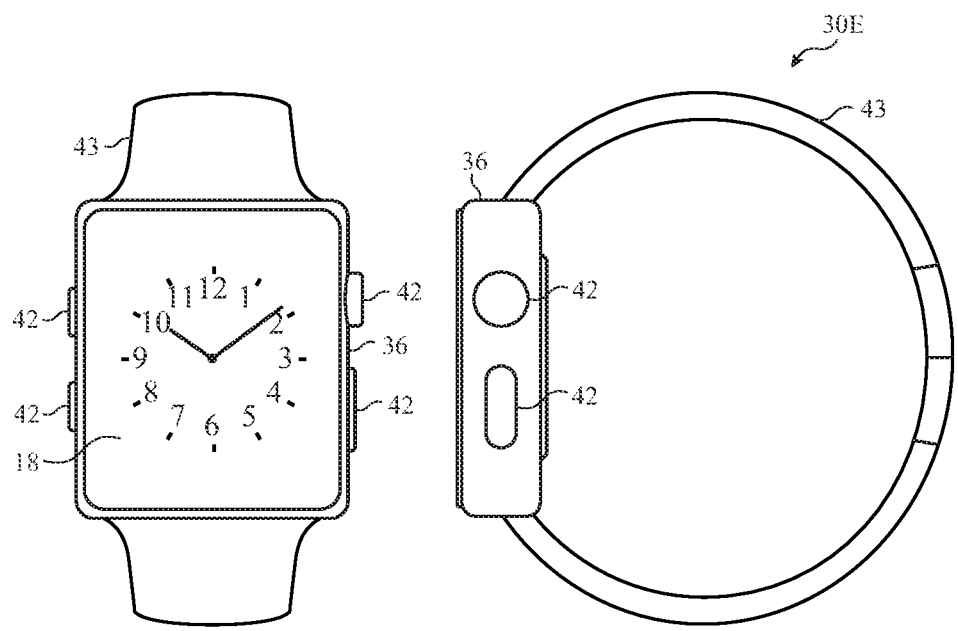
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link. The I/O interface 22 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 22 may also include interfaces for, for example, broadband fixed wireless access networks (e.g., WiMAX), mobile broadband Wireless networks (e.g., mobile WiMAX), and so forth.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, organic light emitting diode display, active-matrix organic light emitting diode (e.g., AMOLED) display, and so forth), which may allow users to interact with a user interface of the wearable electronic device 30E.

Figure 7:
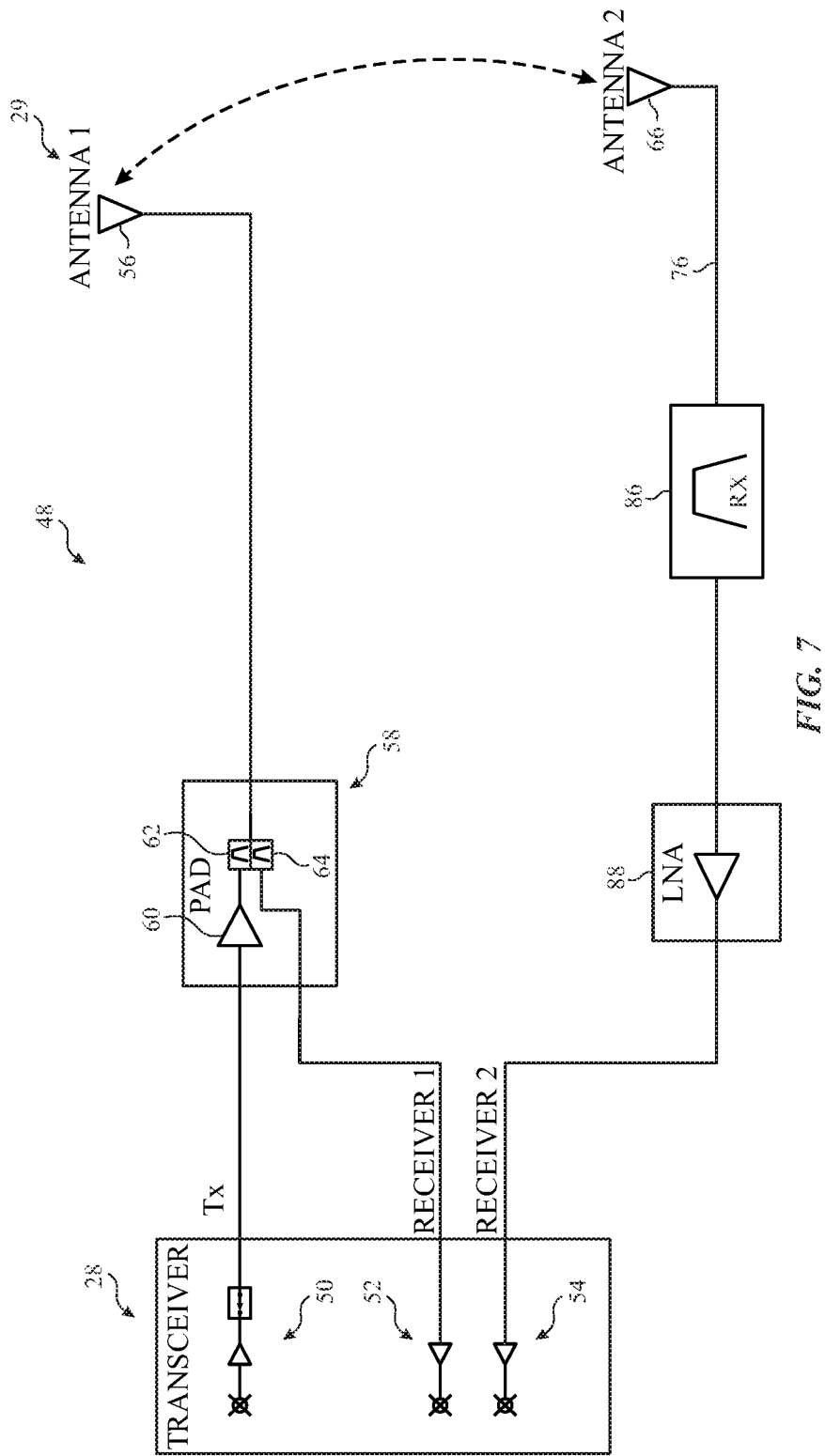
FIG. 7 is a schematic view of an electronic device having two receivers and a transmitter, according to an embodiment.

As discussed previously, the electronic device 10 includes transceiver/receivers 28 and antenna(s) 29. FIG. 7 illustrates a schematic view of the transceiver/receiver(s) 28 and the antenna(s) 29 of an electronic device 48. The electronic device 48 may be a possible embodiment of the electronic device 10. In the illustrate embodiment, the transceiver/receiver(s) 28 includes a transmitter 50 and two receivers 52 and 54. Alternatively, the transceiver/receiver(s) 28 may include any number of transmitters and any number of receivers. Similarly, the antenna(s) 29 may include one or more antennas. Moreover, the transmitter 50 and the receiver 52 form a transceiver connection through a first antenna 56 through a transceiver circuitry 58. The transceiver circuitry 58 includes an amplifier 60 to amplify signals to be transmitted via the first antenna 56. The transceiver circuitry 58 also includes a transmitter filter 62. The transmitter filter 62 filters out noise to reduce or eliminate noise from the transmitted signal. For instance, the transmitter filter 62 may be a band pass filter that blocks frequencies that are not the transmission frequency (f_Tx). The transceiver circuitry 58 also includes a receiver filter 64 that blocks frequencies other than a receiving frequency (f_Rx).

Figure 8:
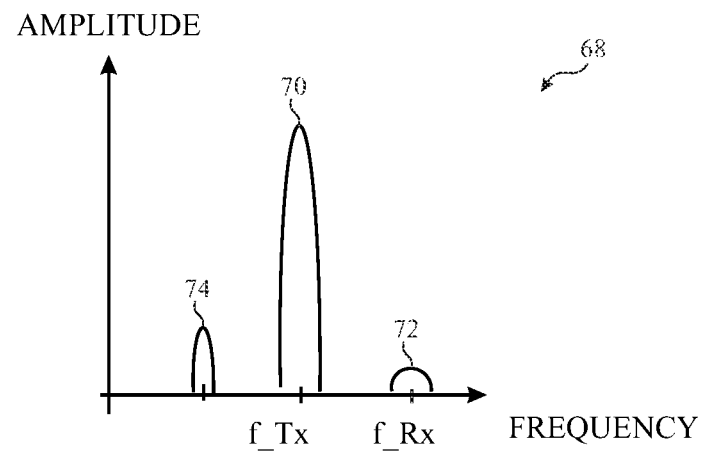
FIG. 8 illustrates a frequency spectrum graph of wireless signals at a first antenna of the electronic device of FIG. 7, according to an embodiment.

A signal at the first antenna 56 may include transmitted data and received data at different frequencies. For example, FIG. 8 illustrates a graph 68 of received frequencies and their respective amplitudes. Specifically, the transmitted data 70 has a relatively high amplitude at a transmission frequency, and the received data 72 has a relatively low amplitude at a receiver frequency. Additionally, noise signals 74 may also be received at the same frequencies and/or other frequencies having respective amplitudes. The transmitter filter 62 would be configured to pass the transmitted data 70 while blocking other frequencies (e.g., receiver frequency) from the transmitter 50.

Figure 9:
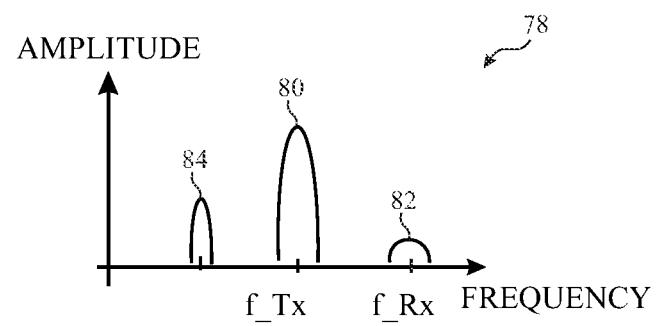
FIG. 9 illustrates a frequency spectrum graph of wireless signals at a second antenna of the electronic device of FIG. 7, according to an embodiment.

Returning to FIG. 7, in the illustrated embodiment, the receiver 54 connects to a second antenna 66. The antenna 66 receives a signal 76. However, this received signal 76 includes more than receiver data that is to be received by the receiver 54. For instance, FIG. 9 illustrates a frequency spectrum graph 78 of the received signal 76. As illustrated the received signal 76 includes transmission data 80 that is transmitted at a transmission frequency. This information is transmitted from the first antenna 56 at the transmission frequency. Such data received at the second antenna 66 may be referred to as cross-interference since this signal interferes with proper interpretation of receiver data 82 if not compensated for. The second antenna 66 also receives some noise signals 84 that may also interfere with the data interpretation.

Figure 10:
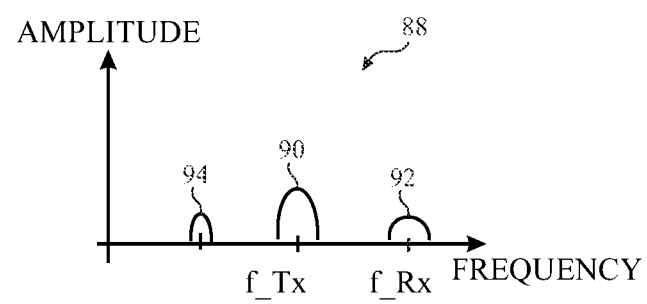
FIG. 10 illustrates a filtered wireless signal, according to an embodiment

Returning to FIG. 7, to isolate the receiver data 82, the electronic device 48 may include a receiver filter 86 that passes the receiver frequency while blocking other frequencies. FIG. 10 illustrates a frequency spectrum diagram 88 of the filtered received data. The filtered received data includes a filtered transmission signal 90 that includes reduced values at the transmission frequency, a filtered receiver signal 92, and filtered noise 94. As illustrated, the filter has reduced an amplitude of the transmission signal 80 and the noise 84. The frequency spectrum diagram 88 may also reflect the result of filtering using the receiver filter 64.

However, the filter 86 (and the receiver filter 64) may be lossy that causes losses to the relatively low amplitude receiver data 82 even at the receiver frequency. Since the receiver data 82 has a relatively low amplitude, losing a portion of the signal 82 may significantly interfere with the fidelity of the receiver data 82.

Figure 11:
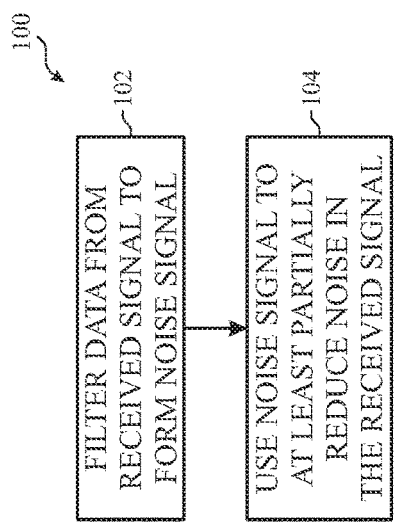
FIG. 11 illustrates a flowchart diagram of a process to reduce noise for a wireless transmission, according to an embodiment.

Thus, to reduce signal loss of the receiver data 82, the electronic device 10 may instead use an alternative filtering process to filter relatively high and/or unwanted signals to maintain signal fidelity of the receiver data 82. For example, FIG. 11 illustrates a filtering process 100 that may be employed by the electronic device 10 to filter a received signal that is received at a receiver. For example, the receiver receiving the signal may be a single receiver, part of a transceiver, or part of an array of receivers/transceivers. The received signal is filtered to eliminate or reduce the received data 82 to form a noise signal (block 102). The receiver data 82 is data that is to be received by the receiver for processing. In other words, a filter is used to remove the wanted data from the received signal to form the noise signal that is composed of unwanted data. The noise signal is then used at least partially reduce noise in the received signal (block 104). For instance, the noise signal may be subtracted from the received signal to reduce or eliminate noise to leave the receiver data 82 substantially unchanged.

In other words, by filtering the signal to remove the unwanted data (e.g., noise), the wanted data is not submitted to a filter that suffers signal loss. Instead, if any loss occurs via the filter, it affects the noise thereby attenuating the noise. However, the noise may have a relatively high amplitude relative to the received data, and some loss to this data may have less effect on the overall signal. Furthermore, attenuation of the noise in the noise signal may reduce how much noise is removed from the received signals, but the receiver data 82 is substantially unchanged.

Figure 12:
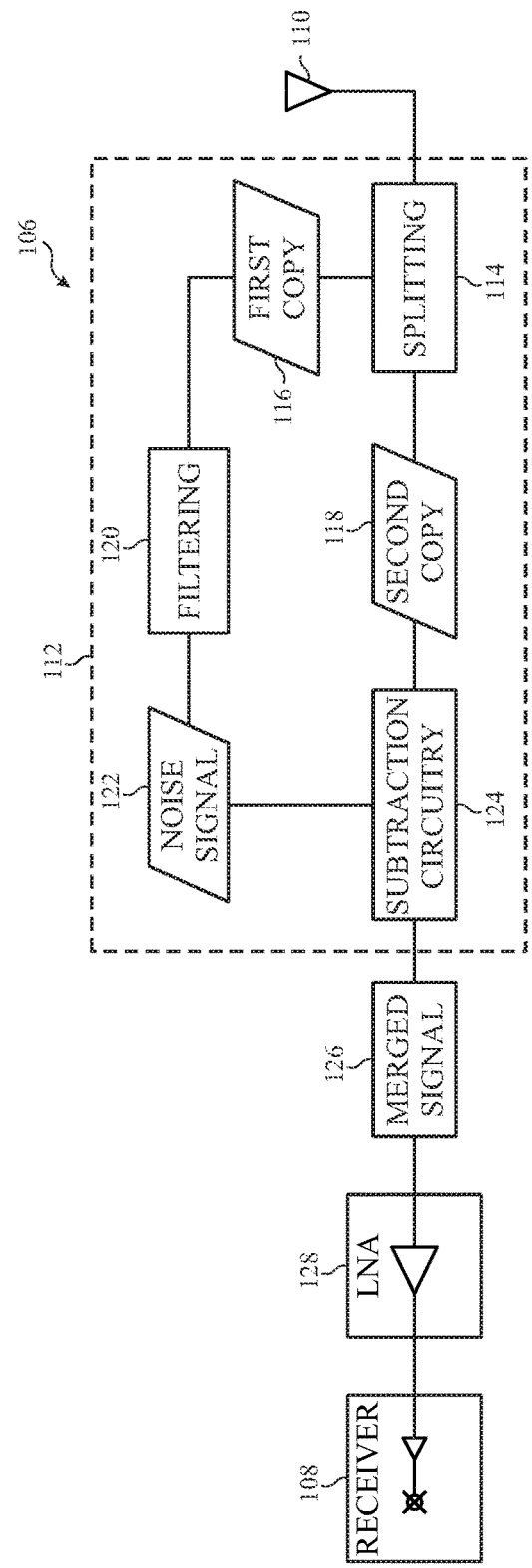
FIG. 12 illustrates a schematic diagram of a receiver system with noise cancellation circuitry, according to an embodiment.

FIG. 12 illustrates a receiver system 106. The receiver system 106 includes a receiver 108 that receives signals via an antenna 110. Before passing received signals to the receiver 108, the receiver system 106 passes the received signals to noise cancellation circuitry 112. The noise cancellation circuitry includes splitting circuitry 114 that splits the received signal into a first copy 116 and a second copy 118 of the received signal. The first copy 116 and the second copy 118 may be substantially the same as each other. Alternatively, the first copy 116 and the second copy 118 may be different scaled values of the received signal.

The noise cancellation circuitry 112 includes a filter 120 that reduces or eliminates an amplitude of frequencies that correspond to the expected received signal to generate a noise signal 122. In other words, the filter 120 reduces or eliminates frequencies that are expected to be received by the receiver 108. The noise cancellation circuitry 112 also includes subtraction circuitry 124. The subtraction circuitry 124 reduces or eliminates the noise from the received signal by canceling out the noise from the received signal that corresponds to the noise signal 122. In some embodiments, the noise cancellation circuitry 112 may include circuitry that performs one or more of the functions discussed herein. Additionally or alternatively, at least a portion of the foregoing functionality may be embodied in software instructions stored in memory 14 and executed by the processor 12.

Once the signals are merged to the merged signal 126, the merged signal 126 is submitted to a low noise amplifier 128. The low noise amplifier 128 may have a set voltage limit that may not be able to handle the relatively high noise amplitude of the noise in the received signal prior to the noise cancellation. Moreover, in some embodiments, the additional amplification and/or filtering may be performed between the low noise amplifier 128 and the receiver 108.

Figure 13:
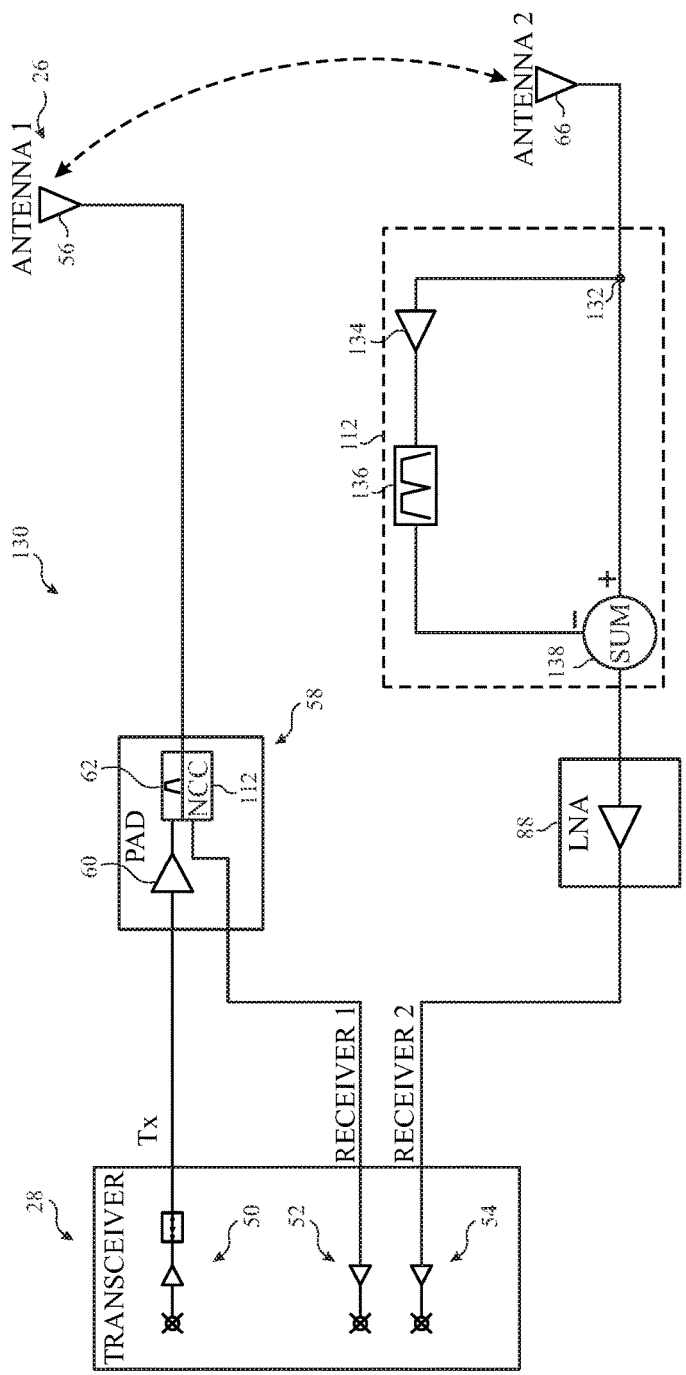
FIG. 13 illustrates a schematic diagram of a receiver system with a band stop filter, according to an embodiment.

FIG. 13 illustrates a receiver system 130 that is similar to the receiver system of FIG. 7 except the receiver system 130 includes noise cancellation circuitry 112 instead of a lone filter as embodied in FIG. 7. The noise cancellation circuitry 112 includes a node 132 that provides the received signal to an amplifier 134 that provides the received signal to a filter 136 at a desired level. Moreover, the amplifier 134 may invert the signal to a proper orientation to cancel out noise when recombined with the received signal. Additionally or alternatively, the amplifier 134 may amplify/attenuate the signal to compensate for any signal changes that may occur at the node 132 when the received signals are split. In some embodiments, the amplifier 134 may be a class C-type amplifier that is shut off until the received signal passes a certain amplitude. In other words, in such embodiments, since the cross-interference is relatively high-powered, a class C-type amplifier may be used to filter enable the cross-interference circuitry 112 only when the cross-interference is present.

The filter 136 includes a band stop filter that stops/reduces amplitude of the data portion of the received signal that is to be passed to the receiver 54. Thus, a noise signal is passed from the filter 136 to summing circuitry 138. The noise signal includes all of the received signal less signals at the expected frequency of the receiver data to be received by the receiver 54. The summing circuitry 138 includes any circuitry that may be used to subtract the noise signal from the received signal. For example, if the amplifier 134 does not invert the signal, the summing circuitry may include an operational amplifier that couples the noise signal to the negative input and the received signal to the positive input. Alternatively, if the amplifier 134 inverts the received data before filtration, the summing circuitry 138 may include a simple wire connection directly connecting the two signal lines into a single line.

Figure 14:
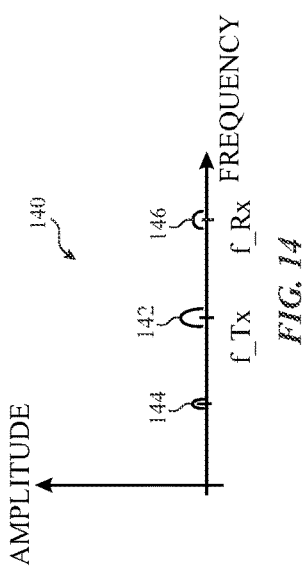
FIG. 14 illustrates a frequency spectrum graph of a noise canceled signal using the noise cancellation circuitry of FIG. 12, according to an embodiment.

After combination of the signals, signals other than the receiver data should be reduced in the received signal. For example, FIG. 14 illustrates a frequency spectrum graph 140 of frequencies within the received signal. As illustrated, the amplitudes of transmission noise 142 and miscellaneous noise 144 are reduced while the amplitude of the receiver data 146 is substantially unchanged. This result occurs essentially replaces graph 88 of FIG. 10 corresponding to the previous embodiment. This reduced interference occurs even though the cross-channel interference received may be the same in the embodiments 48 and 130 (as well as the other embodiments discussed herein) of the electronic device 10. Specifically, each embodiment discussed herein includes a received signal, at the receiver 56, having a frequency spectrum that may correspond to the graph 68 of FIG. 8 and the signal at the receiver 66 corresponds to the unfiltered signal illustrated by the frequency spectrum graph 78 of FIG. 9. In other words, the cross-channel interference is reduced by the filtration even when the cross-channel interference is present in the unfiltered data. For the purposes of discussion, each of the remaining embodiments include the received signals at receivers 56 and 66, as illustrated by graph 68 of FIG. 8 and graph 78 of FIG. 9, respectively, and each embodiment may produce a reduced-interference signal as illustrated by the frequency spectrum graph 88 of FIG. 10 after filtration.

Figure 15:
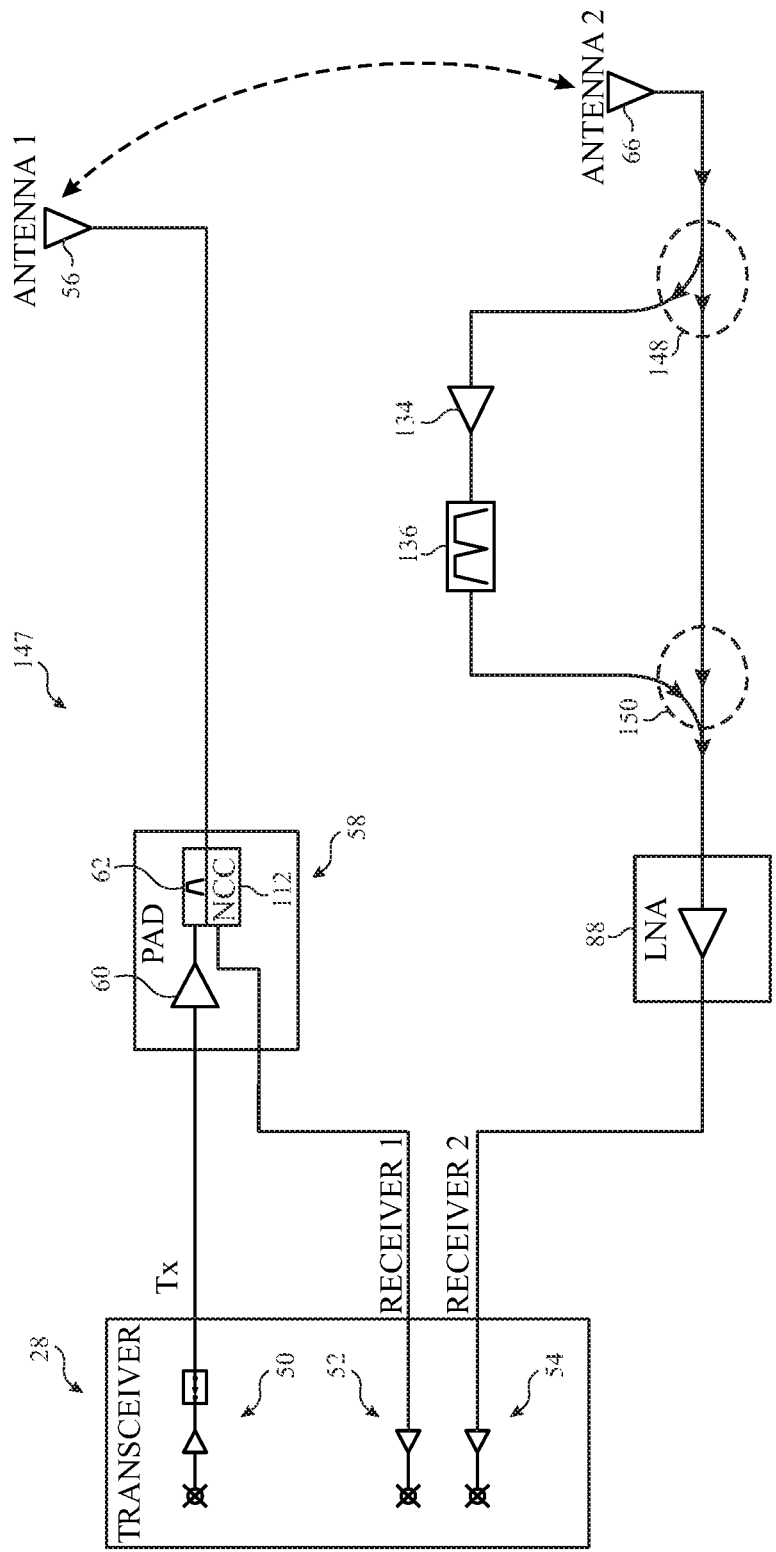
FIG. 15 illustrates a schematic diagram of a receiver system with noise cancellation circuitry having directional couplers, according to an embodiment.

FIG. 15 illustrates a receiver system 147 that includes directional coupler 148 to split the received signal into two parts. The receiver system 147 also includes a directional coupler 150 that combines the noise signal back with the received signal.

FIG. 16 illustrates a receiver system 147 that includes a band pass filter 154 that passes frequencies that do not correspond to the receiver data. For instance, the band pass filter 154 may be designed to pass a transmission frequency to ensure that the noise signal includes the transmission signal. Furthermore, any frequency other than the frequency of the received data may be passed to the noise signal. As more noise frequencies are permitted into the noise signal, the noise signal is capable to reduce more noise from the received signal.

FIG. 17 illustrates a frequency response spectrum graph 156 of the merged signal using the band pass filter 154. The frequency response spectrum graph 156 reflects that the transmission frequency 158 was passed through the filter to be canceled in the merged signal. However, miscellaneous noise 160 and the receiver data 162 frequencies have their amplitude substantially unchanged due to being filtered out from received signal when the noise signal is formed.

Figure 18:
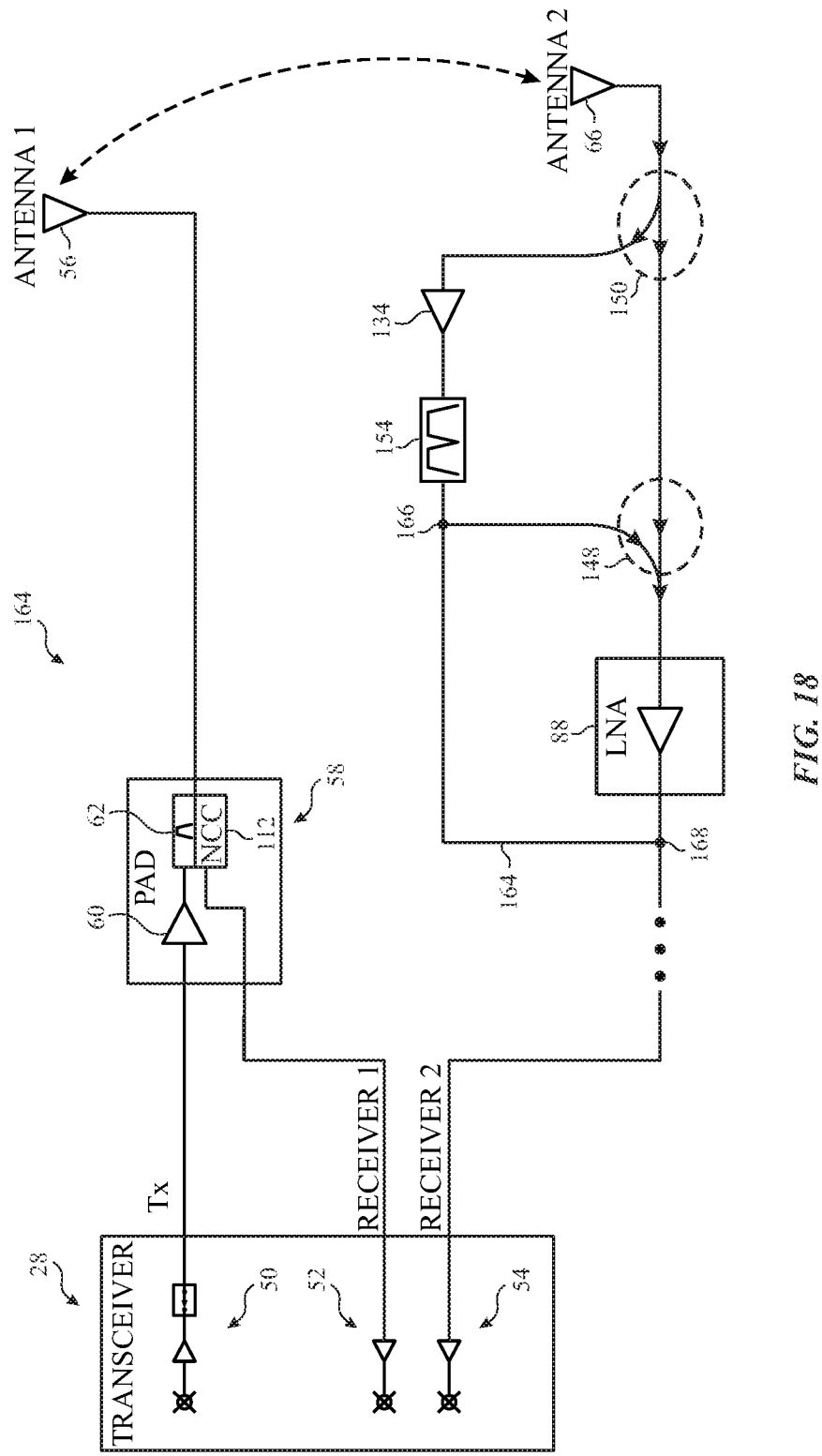
FIG. 18 illustrates a schematic diagram of a receiver system with noise cancellation circuitry with feed forward circuitry, according to an embodiment.
Figure 10:
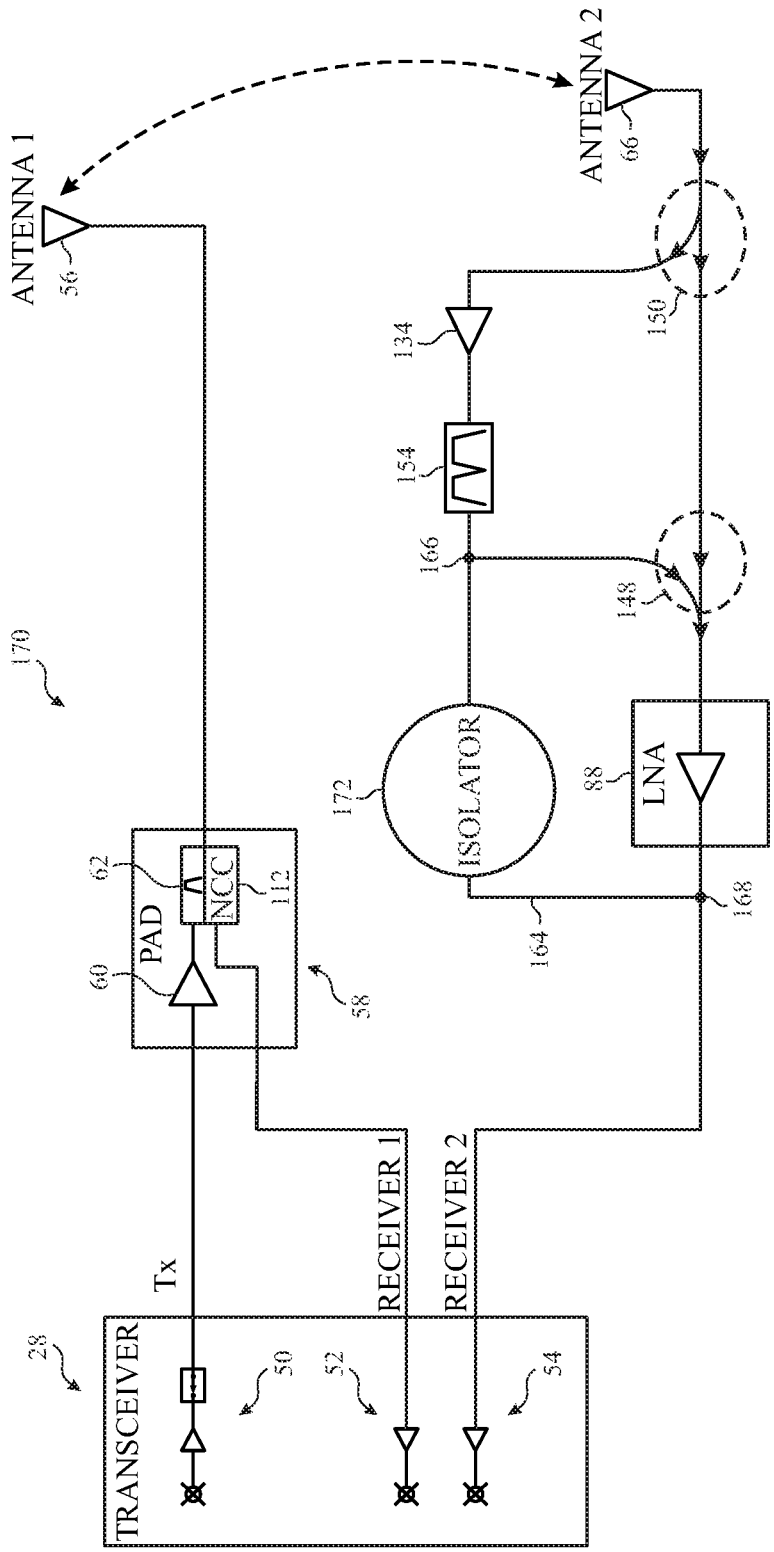

FIG. 18 illustrates a schematic diagram of a receiver system 164 that includes feed forward circuitry 164 that feeds forward the noise signal from node 166. Specifically, the node 166 may be a hardwire connection and/or directional couplers that connect node 168 to the noise signal. Similarly, node 166 may be a hardwire connection, directional couplers, and/or summing amplifiers to add or subtract the noise signal from a signal received from the LNA 88. Additionally or alternatively, the feed forward circuitry 164 may be used to pass the noise signal to additional cancellation circuitry further upstream from the antenna 66 before the signal is passed to the receiver 54. Thus, the noise signal may be used to cancel noise from the received multiple times.

FIG. 19 illustrates a schematic diagram of a receiver system 170 that includes an isolator 172. The isolator is a device that transmits signals in one direction only. It is used to prevent the signals from passing from the node 168 to the node 166.

Figure 20:
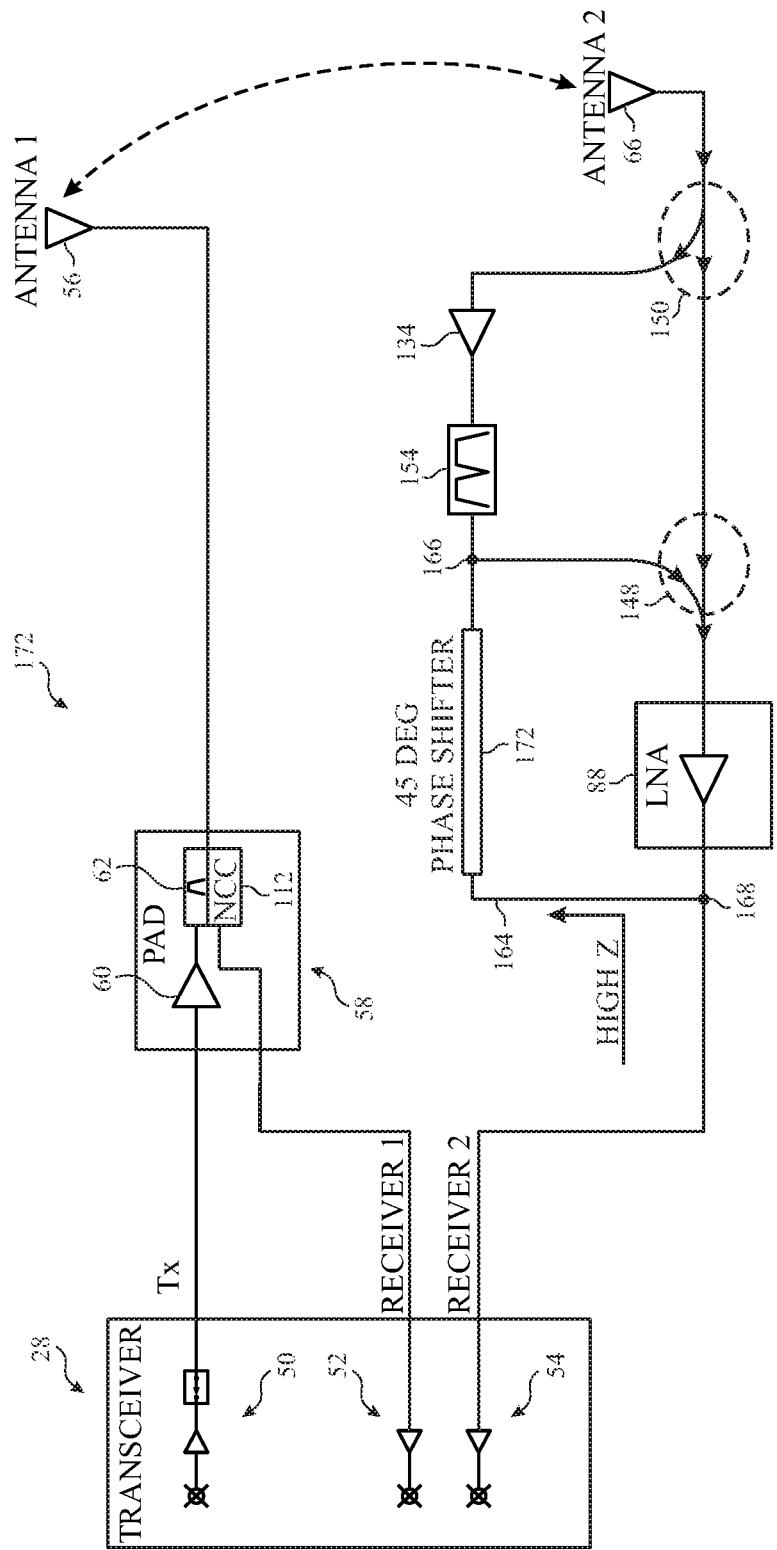
FIG. 20 illustrates a schematic diagram of a receiver system with noise cancellation circuitry with a phase shifter in the feed forward circuitry, according to an embodiment.

FIG. 20 illustrates a receiver system 172 that includes a phase shifter 174 that shifts the phase of the noise signal from the node 166 to the node 168. The phase shifter 174 may shift the signal by 45 degrees to increase resistance back towards the amplifier 134 from node 168.

Figure 21:
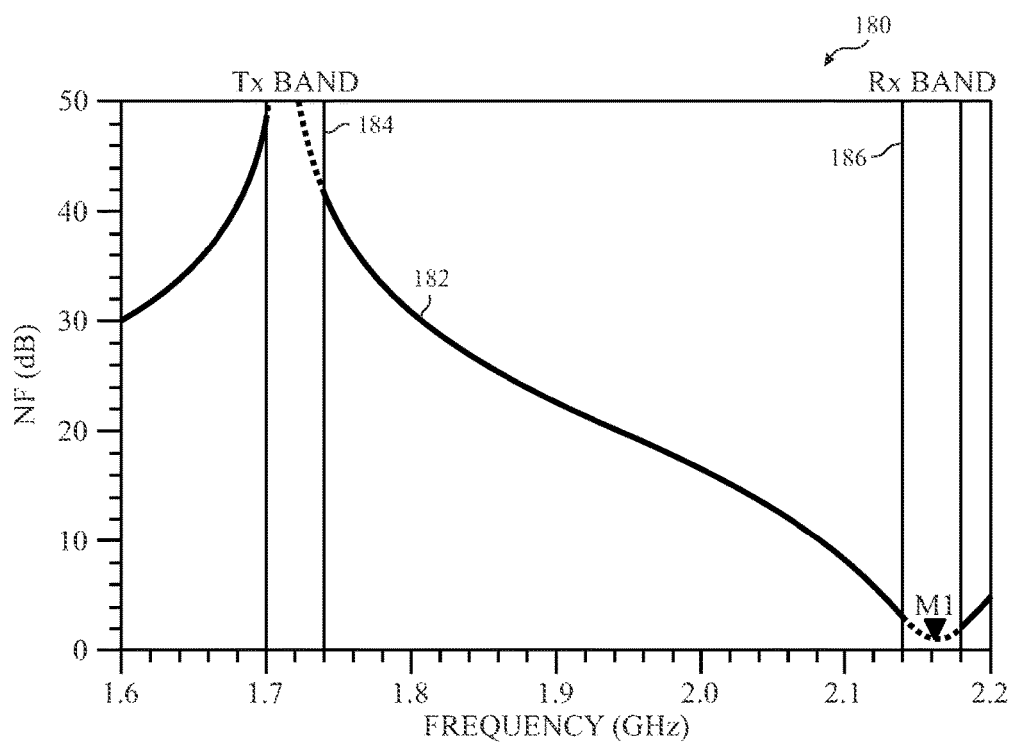
FIG. 21 illustrates a noise figure graph of the received wireless transmission, according to an embodiment.

FIG. 21 illustrates a graph 180 corresponding to a cascaded noise figure for the amplifier 134 and the filter 136. The cascaded noise figure is the ratio of output power to input power in dBs. As illustrated by the noise figure line 182, the amplifier 134 and the filter 136 increase the amplitude of signals having a frequency within the transmission band 184 while decreasing/maintaining/barely amplifying the signals corresponding to the receiver frequencies 186. If additional frequencies are included in the noise signal, those frequencies would also be increased in the cascaded noise figure.

Figure 22:
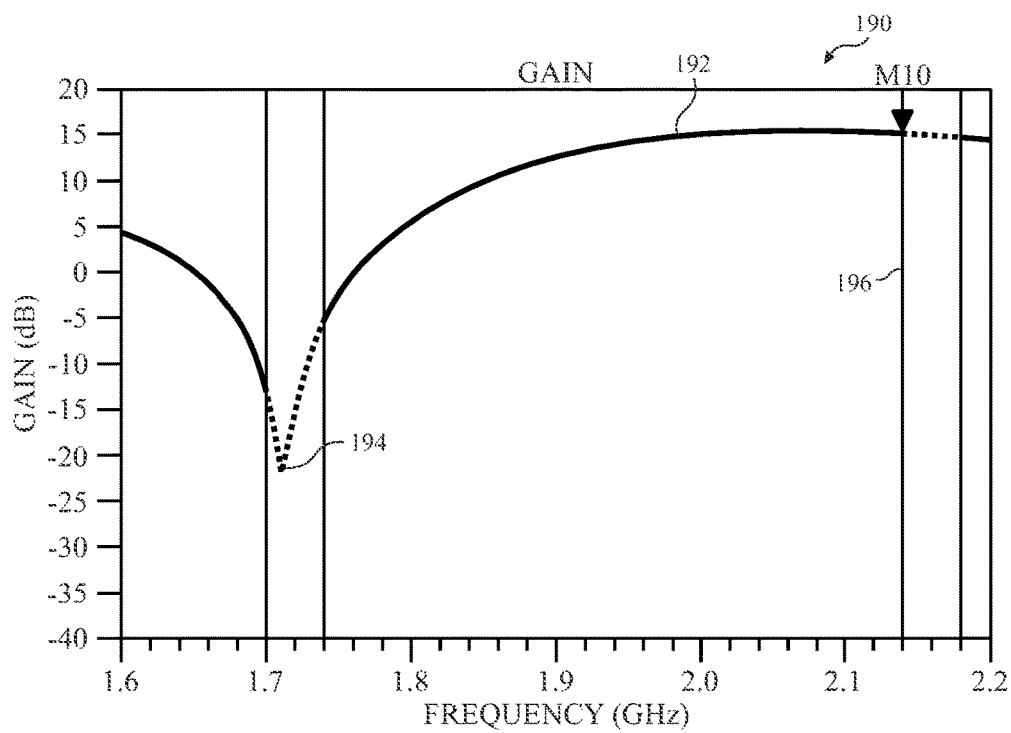
FIG. 22 illustrates a gain graph of the noise cancelled wireless transmission, according to an embodiment.

FIG. 22 illustrates a graph 190 corresponding to amplification gain 192 using the noise cancellation circuitry 112. The gain 192 shows that amplitude of the signals corresponding to the transmission frequency 194 are reduced while the amplitude of the signals corresponding to the receiver frequency 196 are increased. Moreover, if additional frequencies are included in the noise signal, those frequencies would also be decreased in the gain 192.

Figure 23:
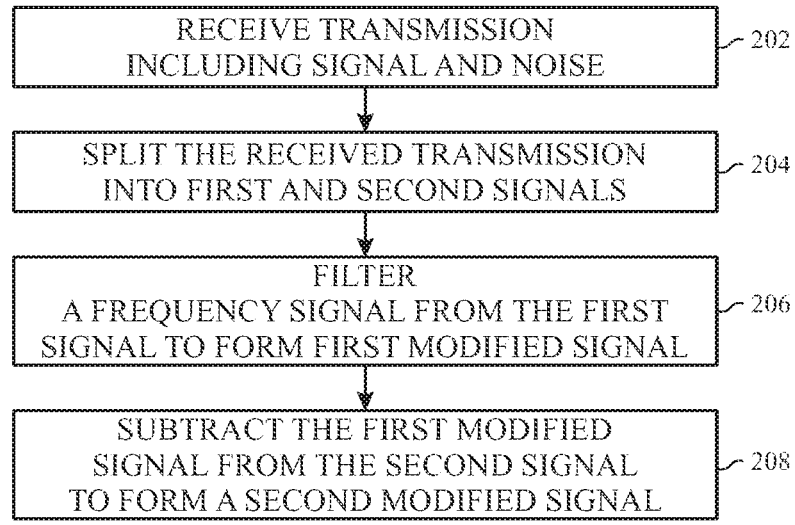
FIG. 23 illustrates a process for reducing noise in a received wireless transmission, according to an embodiment.

FIG. 23 illustrates a process 200 for cancelling noise from received transmissions. A transmission is received at an antenna 66 (block 202). The antenna 66 may be an antenna in a single antenna system or may be one of multiple antennas in a single electronic device. The transmission includes a signal to be received and noise. For example, the transmission may include a received signal and a transmission signal transmitted from another antenna on the electronic device. The received signal is split into first and second signals (block 204). The first and second signals may be copies of the received signal or may be proportional to the received signal. Furthermore, the splitting may be performed using a hardwire connection, a directional coupler, or some other suitable signal splitter. The first signal is submitted to a filter that filters a frequency from the first signal to form a first modified signal (block 204). The first modified signal may also be referred to as a noise signal because the signal to be received have been removed or reduced in the first signal leaving the noise. The filter may be a band stop filter that stops the signal to be received or a band pass filter that passes one or more noise frequency (e.g., transmission frequency).

The first modified signal (e.g., noise signal) is subtracted from the second signal to form a second modified signal (block 208). The subtraction may include a summing amplifier that treats the first modified signal as a negative value. Additionally or alternatively, the first signal or the first modified signal may be inverted (and amplified) prior to subtraction. In such cases, the inverted form of the first modified signal may be summed with second signal as an effective subtraction to substantially cancel out portions of the noise signal found in the second signal.

Figure 24:
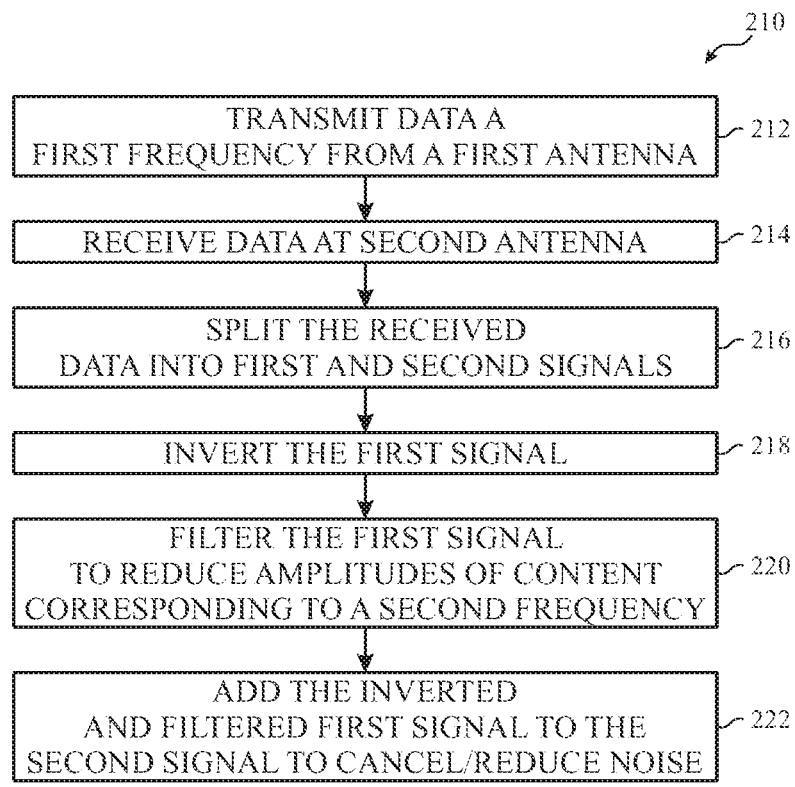
FIG. 24 illustrates a process for reducing cross-interference in a receiver wireless transmission, according to an embodiment.

FIG. 24 illustrates a process 210 for cancelling noise illustrates a process 200 for cancelling noise from received transmissions. Data is transmitted at a first frequency from a first antenna 56 (block 212). Data is also received at a second antenna 66 (block 214). The received data includes signals having the first frequency among other signals. The received data is split into first and second signals (block 216). The first and second signals may be copies of the received signal or may be proportional to the received signal. Furthermore, the splitting may be performed using a hardwire connection, a directional coupler, or some other suitable signal splitter.

The first signal is inverted (block 218). The inversion of the first signal may be performed using the amplifier 134 that amplifies the signal. The inverted first signal is submitted to a filter that filters a second frequency from the first signal (block 220). The second frequency may correspond to an expected frequency of a received signal. In some receiver systems, the filtration may be performed prior to inversion.

The inverted and filtered first signal (e.g., noise signal) is added to the second signal to cancel/reduce at least a portion of the noise in the signal (block 208). The addition may include a summing amplifier, hardwire connection, a directional coupler, or some other signal addition circuitry.

It may be understood that the foregoing process may be embodied using hardware, software, or some combination thereof. For example, a processor may be used to perform instructions stored in memory that are configured to cause the processor to perform the portions of the processes 200 and 210, when executed. In other words, the received signals may be at least partially digitally filtered.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   an antenna configured to receive a wireless transmission, wherein the wireless transmission comprises cross-interference noise and data to be received;
   a signal splitter that splits the wireless transmission into a first signal and a second signal that are substantially the same as each other;
   a filter configured to filter out the data to be received in the first signal;
   merging circuitry configured to subtract the filtered first signal from the second signal to reduce the cross-interference noise in the second signal; and
   a low-noise amplifier that:
   amplifies the second signal after subtracting the filtered first signal from the second signal when the cross-interference noise has a higher amplitude relative to an amplitude of the data.

2. The electronic device of claim 1, wherein the merging circuitry comprises a summing amplifier with subtraction of the first signal comprises inverted addition of the first signal and positive addition of the second signal.

3. The electronic device of claim 1, wherein the merging circuitry comprises:
   an inverter configured to invert the first signal; and
   summing circuitry configured to add the inverted first signal to the second signal as the subtraction.

4. The electronic device of claim 3, wherein the inverter comprises an inverting amplifier configured to amplify and invert the first signal.

5. The electronic device of claim 1, wherein the filter comprises a band stop filter that is configured to filter an expected frequency corresponding to the data to be received.

6. The electronic device of claim 1, wherein the filter comprises a band pass filter that is configured to pass an expected frequency of the cross-interference noise.

7. A receiver system comprising:
   a first antenna configured to transmit data at a first frequency;
   a second antenna configured to receive data, wherein the received data comprises cross-interference at the first frequency and a data signal at a second frequency;
   a signal splitter configured to split the received data into a first and second signal that are substantially the same as each other;
   a filter configured to filter the second frequency in the first signal; and
   merging circuitry configured to reduce the cross-interference in the second signal by merging the filtered first signal with the second signal; and
   a low-noise amplifier that amplifies the second signal after merging the filtered first signal and the second signal when the cross-interference has a higher amplitude relative to an amplitude of the data signal.

8. The receiver system of claim 7, wherein the received data comprises noise having a third frequency.

9. The receiver system of claim 8, wherein the filter comprises a band stop filter that is configured to reduce an amplitude of the first signal at the second frequency, and the merging circuitry is configured to reduce the noise in the second signal by merging the filtered first signal with the second signal.

10. The receiver system of claim 8, wherein the filter comprises a band pass filter that passes an amplitude of the first signal at the first frequency while reducing the amplitude of the first signal at the second frequency.

11. The receiver system of claim 10, wherein the filter comprises a band pass filter that passes an amplitude of the first signal at the first and third frequencies while reducing the amplitude of the first signal at the second frequency.

12. The receiver system of claim 8, wherein the summing circuitry comprises an amplifier that inverts the first signal before merging the first signal with the second signal.

13. The receiver system of claim 12, wherein the amplifier comprises a class C type amplifier.

14. A method comprising:
    receiving a wireless transmission at an antenna, wherein the wireless transmission comprises cross-interference noise and a data signal;
    splitting the received transmission into first and second signals that are substantially the same as each other;
    filtering the first signal;
    reducing cross-interference noise from the second signal using the filtered first signal; and
    amplifying the second signal using a low-noise amplifier after reducing the cross-interference noise in the second signal using the filtered first signal when the cross-interference noise has a higher amplitude relative to an amplitude of the data signal.

15. The method of claim 14, wherein reducing the cross-interference noise comprises:
    inverting the first signal prior to filtration; and
    summing the inverted and filtered first signal with the second signal.

16. The method of claim 14, wherein reducing the cross-interference noise comprises:
    inverting the first signal after filtration; and
    summing the inverted and filtered first signal with the second signal.

17. A method comprising:
    transmitting output data at a first frequency from a first antenna;

receiving a first signal at a second antenna, wherein the first signal comprises cross-interference from the first antenna at the first frequency and an input data at a second frequency;

splitting the first signal into second and third signals that are substantially the same as each other;

inverting the second signal using a signal inverter;

filtering the second signal to reduce an amplitude of the second signal at the second frequency;

adding the filtered and inverted second signal to the third signal to reduce the cross-interference when the cross-interference has a higher amplitude relative to an amplitude of data in the first signal; and amplifying the second signal using a low-noise amplifier after adding the filtered and inverted second signal to the third signal.

18. The method of claim 17, wherein the input data comprises noise at a third frequency, and adding the filtered and inverted second signal to the third signal reduces the noise.

19. The method of claim 18, wherein filtering the second signal comprises a band stop filter configured to reduce the amplitude of the second signal at the second frequency.

20. The method of claim 17 comprising feeding the inverted and filtered second signal forward for further signal processing.

21. The method of claim 17 comprising preventing flow through the inverter in a reverse direction using an isolator.

22. The method of claim 17 comprising increasing backwards resistance to the inverter using a phase shifter.

23. A method comprising:

filtering data from a received wireless signal to form a noise signal;

reducing cross-interference noise in the received wireless signal using the noise signal by merging the noise signal with the received wireless signal;

amplifying the received wireless signal using a low-noise amplifier after merging the noise signal with the received wireless signal when the cross-interference noise has a higher amplitude relative to an amplitude of data in the received wireless signal.

* * * * *